United States Patent
Murata

(10) Patent No.: US 7,944,788 B2
(45) Date of Patent: May 17, 2011

(54) OPTICAL DISK DRIVE

(75) Inventor: Tatsuya Murata, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 419 days.

(21) Appl. No.: 12/046,361

(22) Filed: Mar. 11, 2008

(65) Prior Publication Data

US 2008/0285409 A1 Nov. 20, 2008

(30) Foreign Application Priority Data

May 16, 2007 (JP) ................... 2007-130472

(51) Int. Cl.
*G11B 7/00* (2006.01)

(52) U.S. Cl. ............... 369/53.13; 369/53.17; 369/53.42

(58) Field of Classification Search ............... 369/53.1, 369/53.12, 53.13, 53.14, 53.15, 53.17, 53.18, 369/53.35, 53.36, 53.42, 53.43, 53.11, 44.32, 369/53.16

See application file for complete search history.

(56) References Cited

U.S. PATENT DOCUMENTS

| | | | |
|---|---|---|---|
| 6,195,322 B1 | 2/2001 | Ohtani et al. | |
| 6,351,440 B1 | 2/2002 | Fukuda | |
| 6,631,105 B1 * | 10/2003 | Fukuda et al. | 369/47.44 |
| 2002/0034140 A1 | 3/2002 | Fukuda | |
| 2002/0105876 A1 * | 8/2002 | Byun et al. | 369/53.15 |
| 2002/0114243 A1 | 8/2002 | Ohta | |
| 2004/0179443 A1 | 9/2004 | Choo | |
| 2007/0274178 A1 | 11/2007 | Kuroda | |

FOREIGN PATENT DOCUMENTS

| | | |
|---|---|---|
| JP | 10-40640 A | 2/1998 |
| JP | 10092090 A | 4/1998 |
| JP | 10188453 A | 7/1998 |
| JP | 2001216737 A | 8/2001 |
| JP | 2002-251844 A | 9/2002 |
| JP | 2003-297007 A | 10/2003 |
| JP | 2004-281041 A | 10/2004 |
| WO | 2005088611 A1 | 9/2005 |

OTHER PUBLICATIONS

Notice of Grounds for Rejection mailed on Mar. 22, 2011 in corresponding JP Application No. 2007130472, 6 pages.
English Language Translation of a Chinese Office Action relating to Chinese Patent Application No. 200810087293.6, mailed Apr. 2, 2010, 1 page.
Chinese Office Action relating to Chinese Patent Application No. 200810087293.6, mailed Apr. 2, 2010, 3 pages.

* cited by examiner

*Primary Examiner* — Nabil Z Hindi
(74) *Attorney, Agent, or Firm* — Seed IP Law Group PLLC

(57) ABSTRACT

An optical disk drive capable of reproducing data even when defects, such as flaws or stains, are present in the disk. A system controller of an optical disk drive reproduces data by setting the maximum speed in accordance with the type of an optical disk, an amount of side-to-side runout, and the like. When reproduction of data becomes impracticable for reasons of meandering of a track, or the like, in the middle of reproduction of data, the rotational speed is decreased, and a retry is performed. However, when reproduction of data becomes impracticable for reasons of flaws or stains, the rotational speed is reversely increased, and a retry is performed.

12 Claims, 4 Drawing Sheets

OPTICAL DISK DRIVE

PRIORITY INFORMATION

This application claims priority to Japanese Patent Application No. 2007-130472 filed on May 16, 2007, which is incorporated herein by reference in its entireties.

BACKGROUND OF THE INVENTION

1. Technical Field

The present invention relates to an optical disk drive, and more particularly to reproduction processing performed when a defect is present in an optical disk.

2. Related Art

A reproduction rate of an optical disk is appropriately optimized according to a reproducing state. For instance, when data are reproduced by means of; for example, equipment incorporated in or connected to a personal computer, the data must be reproduced as fast as possible, and hence a reproduction rate is increased. Further, at the time of playback of a video or music, a transfer rate is determined. Therefore, a reproduction rate which is faster than the predetermined transfer rate is not required. Even if the data can be reproduced at high speed, the reproduction rate is maintained at a low rate in consideration of tranquility.

In the meantime, when side-to-side runout or mass eccentricity is present in an optical disk or when meandering of a track, or the like, is present, data cannot be read when reproduction is performed at a high rate, thereby resulting in occurrence of an error. In consideration of this, decreasing the reproduction rate has been proposed.

JP 10-40640 A discloses that, when excessive vibrations arise in the middle of a disk being subjected to high-speed reproduction or when mass eccentricity of a predetermined amount or greater is detected, the rotational speed of the disk is decreased to perform reproduction at a low rate, thereby diminishing vibrations.

JP 2002-251844 A discloses that, when a poorly-readable area, such as a defect, is detected, data recorded in the poorly-readable area are read without decreasing the rotational speed of the optical disk by means of switching a cutoff frequency of a high-pass filter.

JP 2003-297007 A discloses that the rotational speed of a disk is set to the minimum rotational speed when reproduction of the disk is started and that control is performed so as to increase the rotational speed of the disk stepwise until a read error arises, whereby, when compared-with a case where the rotational speed is decreased from the maximum rotational speed, a time elapsed before reproduction is shortened.

JP 2004-281041 A discloses that, when data are recorded/reproduced in or from an optical disk that rotates at predetermined equiangular velocity, occurrence of an error during recording/reproduction of data is monitored and that, when occurrence of an error during recording/reproduction of data is detected, the rotational speed of the optical disk is controlled so as to come to equiangular velocity which is lower than the predetermined equiangular velocity, thereby shortening a time required to record/reproduce data.

In any of the related-art techniques, when a read area of defects is detected, the rotational speed of the disk is indiscriminately decreased as compared with a case where the read area of defects is not detected. However, the present applicant found that, under such a control method for indiscriminately decreasing rotational speed, data cannot be read depending on the nature of defects in the optical disk. For example, when flaws or stains are present in an optical disk, a read error arises. However, it is found that, even when the rotational speed of the optical disk is decreased as a result of occurrence of a read error, data still remain unreadable and, rather, data-reading performance is degraded.

SUMMARY

The present invention provides an optical disk drive capable of reproducing data even when defects, such as flaws or stains, are present.

The present invention is directed toward an optical disk drive for reproducing data in an optical disk, comprising:

a detection section for detecting a specific area of defects in the optical disk; and a control section for reproducing the data by increasing rotational speed of the optical disk at a location of the area of defects.

The present invention is also directed toward an optical disk drive for reproducing data in an optical disk, comprising:

a section for setting maximum speed conforming to at least type of an optical disk and any of amounts of side-to-side runout, mass eccentricity, and eccentricity in the optical disk;

a section for reproducing data by setting rotational speed of the optical disk to the maximum speed;

a section for determining whether or not disability to reproduce data is attributable to a specific area of defects when reproduction of data becomes impracticable; and a section for reproducing data again by increasing the rotational speed so as to become equal to or greater than the maximum speed when the disability to reproduce data is attributable to the specific area of defects and reproducing data again by decreasing the rotational speed when the disability to reproduce data is attributable to a factor other than the specific area of defects.

In the present invention, when a predetermined area of defects is present in an optical disk, the possibility of reproduction of data can be enhanced by controlling the rotational speed of an optical disk in an increasing manner.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings.

Figure 1:
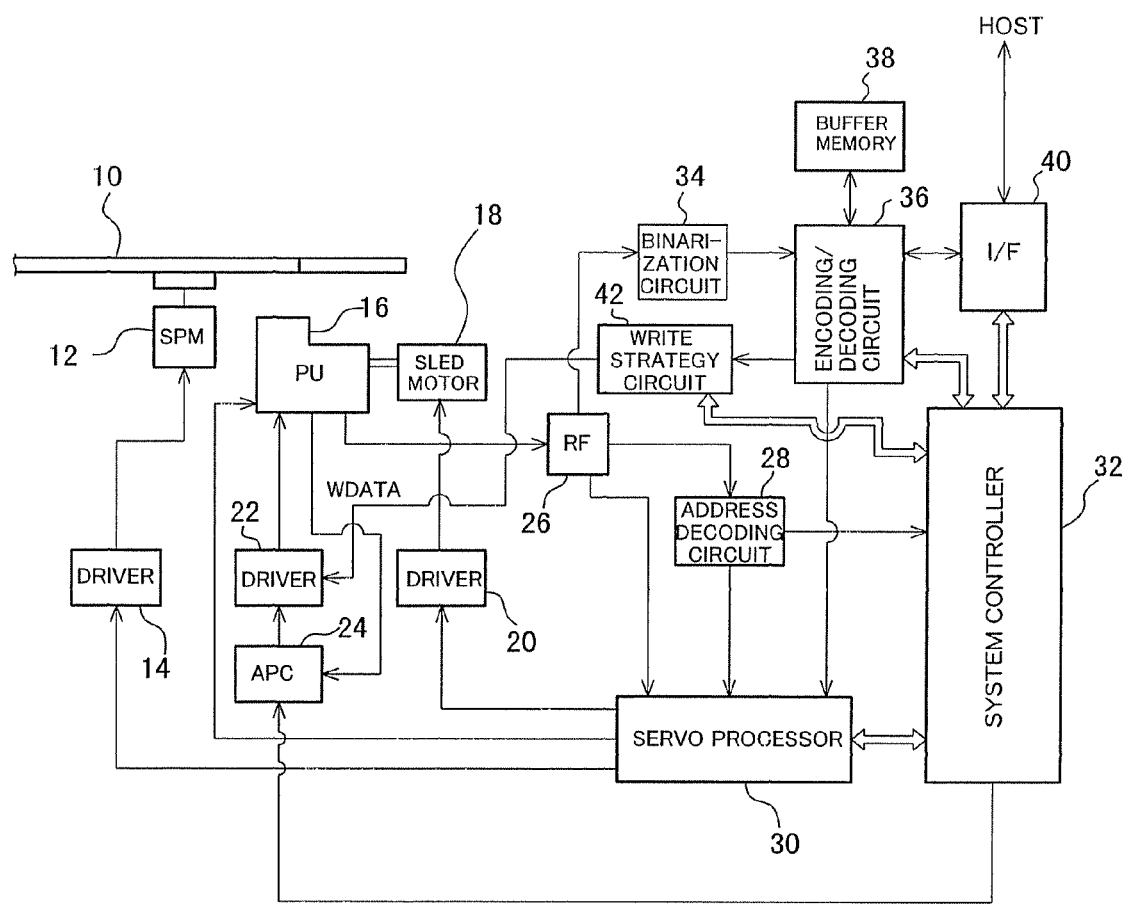
FIG. 1 is an overall block diagram of an optical disk drive.

FIG. 1 shows an overall block diagram of an optical disk drive of the present embodiment. An optical disk 10, such as a CD, a DVD, an HD-DVD, a BD, and the like, is rotationally driven by a spindle motor (SPM) 12. A spindle motor SPM 12 is driven by a driver 14, and the driver 14 is servo-controlled by a servo processor 30 so as to attain desired rotational speed.

An optical pickup 16 includes a laser diode (LD) for emitting a laser beam to the optical disk 10 and a photodetector (PD) that receives light reflected from the optical disk 10 and converts the thus-received light into an electrical signal; and is disposed opposite the optical disk 10. The optical pickup 16 is driven in a radial direction of the optical disk 10 by a sled motor 18, and the sled motor 18 is driven by a driver 20. The driver 20 is servo-controlled by the servo processor 30 as in the case of the driver 14. Further, the LD of the optical pickup 16 is driven by a driver 22. A drive current of the driver 22 is controlled by an automatic power control circuit (APC) 24 in such away that laser power comes to a desired level. In accordance with a command from a system controller 32, the APC 24 and the driver 22 control an amount of light emitted from the LD. In the drawing, the driver 22 is provided separately from the optical pickup 16. However, as will be described later, the driver 22 may also be incorporated in the optical pickup 16.

At the time of reproduction of data recorded in the optical disk 10, a laser beam of reproducing power is emitted from the LD of the optical pickup 16, and the PD converts reflected light of the beam into an electrical signal and outputs the signal. A reproduction signal from the optical pickup 16 is supplied to an RF circuit 26. The RF circuit 26 generates, from the reproduction signal, a focus error signal and a tracking error signal, and supplies the thus-generated signals to the servo processor 30. The servo processor 30 servo-controls the optical pickup 16 in accordance with these error signals, thereby maintaining the optical pickup 16 in an on-focus state and an on-track state. Moreover, the RF circuit 26 supplies an address signal included in the reproduction signal to an address decoding circuit 28. The address decoding circuit 28 demodulates from the address signal address data pertaining to the optical disk 10 and supplies the thus-demodulated address data to the servo processor 30 and the system controller 32.

An example of the address signal is a wobble signal. A track of the optical disk 10 is wobbled by means of a modulated signal of time information showing an absolute address of the optical disk 10. A reproduction signal is extracted from the wobble signal, and the thus-extracted signal is decoded, to thus enable acquisition of address data (ATIP). The RF circuit 26 supplies the reproduced RF signal to a binarization circuit 34. The binarization circuit 34 binarizes the reproduction signal and supplies a resultantly-acquired signal to an encoding/decoding circuit 36. The encoding/decoding circuit 36 subjects the binarized signal to demodulation and error correction, to thus acquire reproduction data; and outputs the reproduction data to a host machine, such as a personal computer, by way of an interface I/F 40. When the reproduction data are output to the host machine, the encoding/decoding circuit 36 temporarily stores the reproduction data into the buffer memory 38 and subsequently outputs the data.

In a case where the optical disk 10 is a data-recordable optical disk, data to be recorded from the host machine are supplied, at the time of recording of data, to the encoding/decoding circuit 36 by way of the interface I/F 40. The encoding/decoding circuit 36 stores the data to be recorded into the buffer memory 38; encodes the data to be recorded; and supplies the thus-encoded data as modulated data to a write strategy circuit 42. In accordance with a predetermined recording strategy, the write strategy circuit 42 converts the modulated data into a multipulse (a pulse train) and supplies the multipulse as record data to the driver 22. Since a recording strategy affects recording quality, the recording strategy is usually fixed to an optimum strategy. A laser beam whose power is modulated by means of the record data is emitted from the LD of the optical pickup 16, whereupon data are recorded in the optical disk 10. After recording of the data, the optical pickup 16 emits a laser beam of reproducing power, to thus reproduce the record data; and supplies the record data to the RF circuit 26. The RF circuit 26 supplies a reproduction signal to the binarization circuit 34, and binarized data are supplied to the encoding/decoding circuit 36. The encoding/decoding circuit 36 decodes the modulated data and verifies the decoded data against record data stored in the buffer memory 38. A result of verification is supplied to the system controller 32. In accordance with the result of verification, the system controller 32 determines whether to continually record the data or to perform alternating operation.

The system controller 32 controls operation of the overall system. However, in the present embodiment, the system controller 32 controls the rotational speed of the optical disk 10 particularly during reproduction of data. Specifically, the system controller 32 supplies a control signal to the driver 14, thereby limiting the rotational speed of the optical disk 10 to the maximum speed conforming to the type of the optical disk 10. When side-to-side runout, mass eccentricity, or eccentricity is present in the optical disk 10, a limitation is imposed on the maximum speed in order to decrease the influence of side-to-side runout, mass eccentricity, or eccentricity. In the case of meandering of a track meanders or low data recording quality, control is performed so as to decrease the rotational speed of the optical disk 10 as in the case of the related-art optical disk drive. In the meantime, when defects, such as flaws or stains, are present in the optical disk 10, the rotational speed of the optical disk 10 is reversely increased in an area of the defects. In a case where data are reproduced from the area of defects, such as flaws or stains, when the rotational speed of the optical disk 10 is decreased, a time during which the optical pickup 16 passes by the area of defects becomes longer correspondingly, and readability is deteriorated. On the other hand, when the rotational speed of the optical disk 10 is reversely increased, the time during which the optical pickup 16 passes by the area of defects becomes shorter correspondingly, the influence of the area of defects can be lessened. The size of the area of defects can be equivalently decreased as a result of an increase in rotational speed. The system controller 32 of the present embodiment can be said to adaptively increase or decrease the rotational speed of the optical disk 10 in accordance with a cause of failure to read data instead of indiscriminately decreasing the rotational speed of the optical disk 10 in the event of a read failure.

Figure 2:
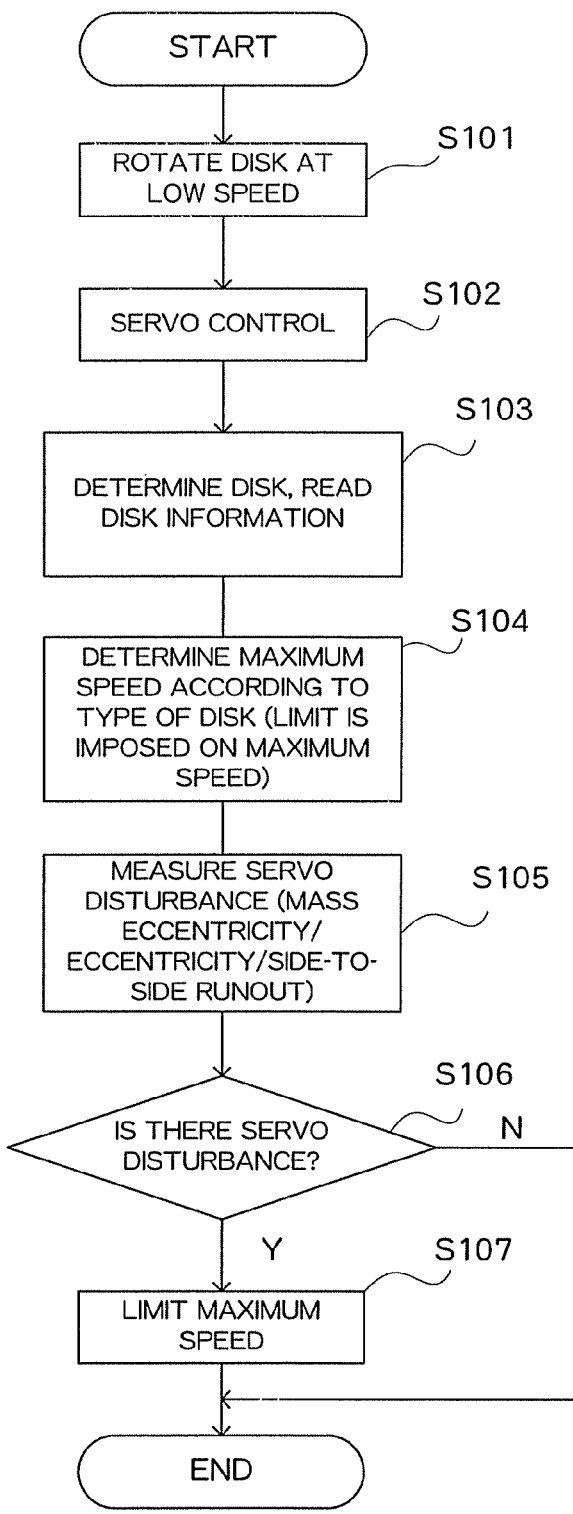
FIG. 2 is a flowchart of processing performed at startup.
Figure 3:
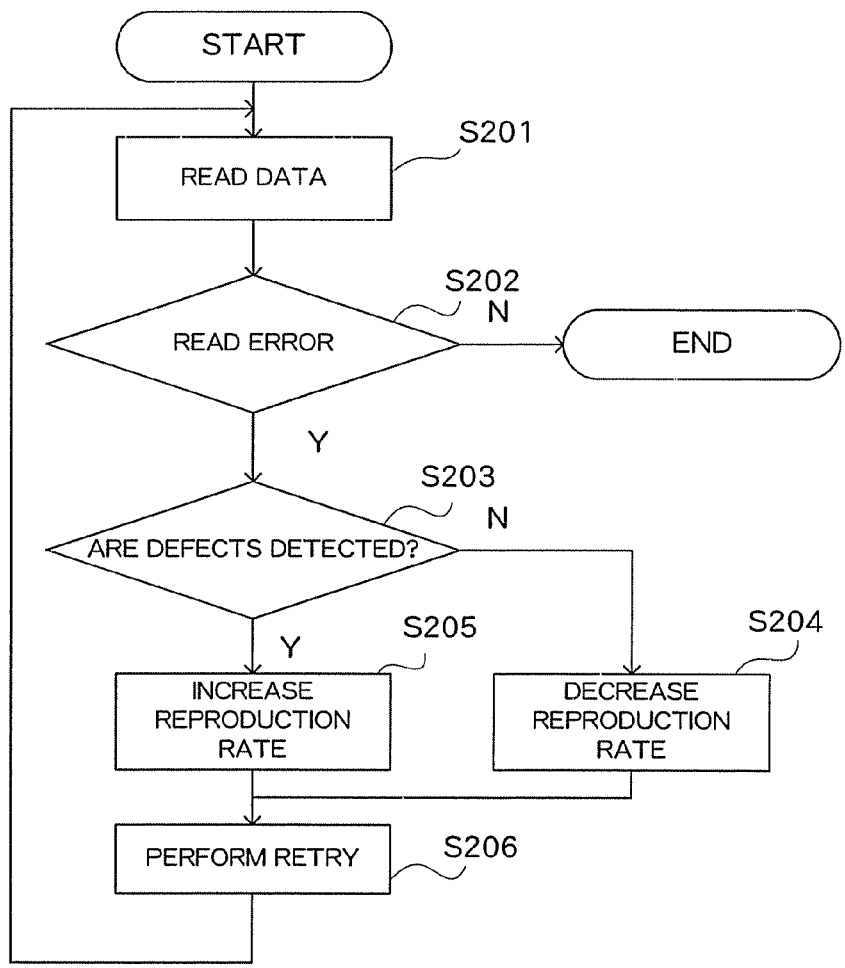
FIG. 3 is a flowchart of processing performed at the time of reproduction of data.

FIGS. 2 and 3 show flowcharts of processing of rotational speed control of the present embodiment. FIG. 2 is processing performed at startup, and FIG. 3 is processing performed at the time of reproduction of data subsequent to startup.

First, in FIG. 2, when the optical disk 10 is loaded in the optical disk drive, the system controller 32 supplies a control signal to the driver 14 to rotationally drive the spindle motor 12, thereby rotating the optical disk 10 at predetermined low speed (S101). A servo system is adjusted while the optical disk 10 is being rotated at low speed; namely, while tracking servo and focus servo are being operated (S102), to read disk information recorded in a lead-in area of the optical disk 10, thereby determining the type of the loaded optical disk 10 (S103). Specifically, a CD, a DVD, an HD-DVD, and a BD (Blu-ray Disk) are discriminated from each other. In the case of the CD, a determination is made as to whether the CD is a CD-DA, CD-ROM, a CD-R, or a CD-RW. In the case of the DVD, a determination is made as to whether the DVD is DVD-ROM, a DVD±R, a DVD±RW, and DVD-RAM. The same also applies to the HD-DVD and the BD, thereby determining the disk to be read-only or recordable. After the type of the optical disk 10 has been determined, the maximum speed is set according to the determined type of the optical disk 10 (S104). For instance, when the optical disk 10 is a DVD±R, the maximum speed is set to 8× speed. In the case of a DVD±RW, the maximum speed is set to 6× speed. The maximum speeds are previously determined for respective types of the optical disks 10, and the thus-determined speeds are stored in the form of a map in the memory of the system controller 32. The maximum speed is set by use of the map. The maximum speed for data may also be set as distinguished from the maximum speed for a video and audio.

After the maximum speed is set according to the type of the optical disk 10, servo disturbance is measured (S105). Measurement of servo disturbance is for measuring an amount of side-to-side runout, mass eccentricity, or eccentricity in the optical disk 10. For example, the optical disk 10 is rotationally driven at the maximum speed set in S104, to thus detect and measure an amplitude of an error signal of the servo system. When servo disturbance is present, the amplitude of the error signal (e.g., a tracking error signal) is increased. Servo disturbance is determined to be present from a result of measurement of servo disturbance. Namely, when servo disturbance (the amplitude of an error signal of the servo) is compared with a predetermined value and when the predetermined value or more is achieved, servo disturbance is determined to be present (S106), and the maximum speed set in S104 is further limited (S107). In the meantime, when no servo disturbance is determined to be present in S106, the maximum speed set in S104 is maintained as it is.

As mentioned above, the maximum speed is set according to the type of the optical disk 10, an amount of side-to-side runout, mass eccentricity, or eccentricity in the optical disk 10. After setting of the maximum speed, the optical disk 10 is rotationally driven at the maximum speed, to thus reproduce data. After completion of startup processing, processing proceeds to data reproduction processing shown in FIG. 3.

In FIG. 3, the system controller 32 reproduces (reads) data in the optical disk 10 at the maximum speed (S201), thereby determining whether or not a read failure (a read error) has arisen (S202). The current rotational speed is maintained unless a read failure arises, and reproduction of data is continually performed. In the meantime, when a read error arises, processing proceeds to a read retry for attempting to reproduce data again at the same location. However, when a read error arises in the related art, a read retry is performed by indiscriminately decreasing the rotational speed. However, in the present embodiment, when the read error arises, a cause of the read error is determined, thereby determining whether or not the read error is attributable to flaws or stains, or defects like fingerprints (S203). When flaws or stains or fingerprints are present on a data surface of the optical disk 10, an amount of light returned from the optical disk 10 is decreased correspondingly. Hence, an amount of light detected by the photodetector of the optical pickup 16 is decreased. Therefore, defects, such as flaws or stains, can be detected in the form of a decrease in the amplitude of a detection signal. When defects, such as flaws or stains, are present in the optical disk 10, a time during which the defects are passed is decreased by increasing the rotational speed of the optical disk 10 rather than decreasing the rotational speed, thereby lessening the influence of the defects. Accordingly, when the read error is determined to be attributable to the defects, the system controller 32 performs a retry by increasing rotational speed (S205 and S206). In the meantime, when the read error is determined not to be defective; for example, when the read error is attributable to meandering of a tack or low recording equality, the system controller 32 performs a retry by decreasing the rotational speed as before (S204 and S206).

The essential requirement for the system controller 32 is to increase rotational speed only for a given period of time when rotational speed is increased. Moreover, the rotational speed is increased in excess of the maximum speed set in S104 and S107 shown in FIG. 2. For instance, when the maximum speed set in S104 and S107 is 6× speed and when the disk is determined to be defective in S203, the system controller 32 increases rotational speed from 6× speed to 8× speed only for a given period of time, thereby performing a retry. Since a retry is usually limited to a given period of time (a timeout of a read command), rotational speed is increased at least for a period of this time. When a read error arises, the rotational speed is increased so as to exceed the maximum speed set in S104 and S107. The reason for this can be said to be that higher priority is given to reproduction processing performed at the time of detection of defects rather than reproduction processing taking into account the type of the optical disk 10, the influence of side-to-side runout, and the like. When data can be reproduced as a result of a retry being performed by increasing rotational speed, NO is rendered in S202. Retry processing is completed, and reproduction processing is continually performed at the next address. The rotational speed of the optical disk 10 returns to the original rotational speed after lapse of a given period of time; namely, the maximum speed set in S104 and S107. After attainment of a success in a retry, the rotational speed may also be reset to the original rotational speed. The reason for resetting the rotational speed to the original number of revolutions is that a greater effect of preventing occurrence of a read error is yielded in normal times by means of performing reproduction processing at rotational speed taking into account the type of the optical disk 10 or the influence of a side-to-side runout rather than prioritizing reproduction processing performed at the rotational speed attained at the time of detection of defects. In the meantime, when a read error still arises even when a retry is performed by increasing rotational speed, the rotational speed is further increased (S205). For instance, in a case where a read error arises while the disk is rotationally being driven at 6× speed and where the read error still remains even when a retry is performed while the speed is increased to 8× speed, a retry is again performed by increasing the speed to 10× speed. Thus, rotational speed is increased stepwise until data can be reproduced by means of a retry. Theoretically, the rotational speed can be increased to the maximum speed at which the optical disk drive can be driven. When the rotational speed of the optical disk 10 is increased, the influence of defects, such as flaws or stains, is lessened. However, there is a potential of the influence of side-to-side runout, mass eccentricity, or eccentricity becoming noticeable. Therefore, a tradeoff exists between the influence of defects resulting from an increase in rotational speed and the influence of side-to-side runout, or the like. Data can be said to be reproduced in the presence of defects and at the maximum speed within a range where a read error is not caused by side-to-side runout, mass eccentricity, or the like.

As is evident from FIG. 3, even when a read error arises, rotational speed is increased only in a case where defects are present. For instance, even when defects are detected, rotational speed is not increased and maintained as it is unless a read error arises. When a read retry is performed for reasons of occurrence of a read error, a limitation may also be imposed on the number of read retry operations. For instance, in a case where the read error is not solved even when a read retry is performed three times, predetermined error processing, such as interruption of reproduction processing, is performed without involvement of a further increase in rotational speed.

Figure 4:
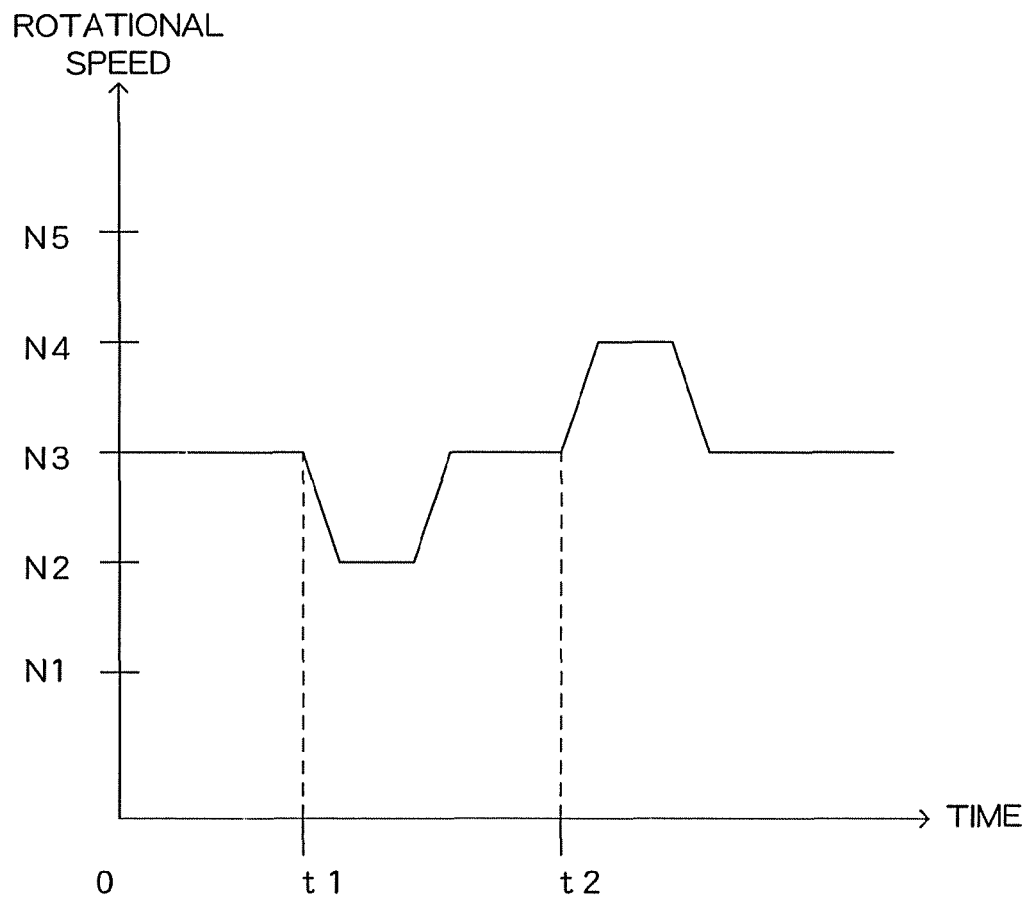
FIG. 4 is a descriptive view of a chronological change in rotational speed.

FIG. 4 shows an example chronological change in rotational speed achieved in the present embodiment. The horizontal axis represents a time, and a time t=0 is set to a start time. The vertical axis represents rotational speed. Five speed levels N1, N2, N3, N4, and N5 (N1<N2<N3<N4<N5) are present. For example, N1 is 2× speed; N2 is 4× speed; N3 is 6× speed; N4 is 8× speed; and N5 is 10× speed. The maximum speed set in S104 and S107 is assumed to be N3. Reproduction of data is assumed to be commenced at the maximum speed N3, and a read error is assumed to have arisen at time t1. At this time, when the read error is attributable to meandering of a track or low recording quality (defective formation of bits or marks, or the like), the system controller 32 decreases rotational speed from the current speed level N3 to the level N2 that is lower than the current speed level by one, to thus perform a retry. After elapse of a given period of time, the rotational speed is assumed to be returned to the original level N3 from N2, and reproduction of data is assumed to be continually performed. A read error is assumed to again arise at time t2. At this time, when the read error is attributable to defects, such as flaws or stains, the system controller 32 increases the rotational speed from the current speed level N3 to N4 that is higher than the current level by one, and retries reading. N4 is speed which exceeds N3 that is the maximum speed achieved at time t−0. A finite time elapses before rotational speed is increased from N3 to N4. Even when data can be reproduced by means of a read retry before achievement of N4, the rotational speed is increased to N4. After elapse of a given period of time, rotational speed is again returned from N4 to N3, and reproduction of data is continually performed. As a matter of course, as mentioned previously, the rotational speed may also be returned from N4 to the original speed level N3 at a point in time when a retry becomes successful without elapse of a given period of time.

There is a limit on the number of read retry operations. When a read retry is allowed up to; for example, three times, the first retry may also be performed by increasing the rotational speed from N3 to N4, and the second retry may also be performed by increasing the rotational speed from N4 to N5. The rotational speed can be increased during a period of retry processing.

As mentioned above, in the present embodiment, when a read error arises and when the read error is attributable to defects, such as flaws or stains, the rotational speed is increased. When the read error is attributable to meandering of a track or low recording quality rather than defects, a read retry is performed by decreasing the rotational speed, whereby data can be reproduced without fail.

In the present embodiment, the maximum speed is determined in S104 and S107. However, the maximum speed may also be determined in only S104 or S107. Specifically, the maximum speed may also be set in accordance with at least the type of an optical disk and any of amounts of side-to-side runout, mass eccentricity, and eccentricity in the optical disk.

Although defects are detected during the course of reproduction of data in the present embodiment, presence or absence of defects in the optical disk 10 may also be detected prior to reproduction of data, and an address of an area of the defects may be stored in the memory of the system controller 32. When the address of data to be reproduced coincides with the address of the area of the defects, the rotational speed of the optical disk 10 may also be increased. Specifically, when the range of addresses of defects is assumed to be d1 to d2 and when an address employed at the time of reproduction of data falls within the range of addresses of the defects, the rotational speed of the optical disk 10 is increased from N3 to N4. When the address achieved at the time of reproduction of data falls outside the range of addresses of the defects, the rotational speed is returned to N3. By means of the configuration, the rotational speed is increased regardless of whether or not a read error has arisen. However, the possibility of the ability to reproduce data without performance of a read retry is enhanced.

What is claimed is:

1. An optical disk drive for reproducing data in an optical disk, comprising:
    a detection section for detecting a specific area of defects in the optical disk; and
    a control section for reproducing data from the specific area of defects by increasing rotational speed of the optical disk.

2. The optical disk drive according to claim 1, wherein the detection section detects the area of defects when data in the optical disk becomes irreproducible.

3. The optical disk drive according to claim 1, further comprising:
    a section for setting maximum speed according to a type of the optical disk, wherein
    the control section increases the rotational speed in excess of the maximum speed.

4. The optical disk drive according to claim 1, further comprising:
    a section for setting maximum speed according to an amount of side-to-side runout, mass eccentricity, or eccentricity in the optical disk, wherein
    the control section increases the rotational speed in excess of the maximum speed.

5. The optical disk drive according to claim 2, wherein the control section again reproduces data in an area where reproduction of the data becomes impracticable, by increasing the rotational speed.

6. The optical disk drive according to claim 5, wherein the control section increases the rotational speed for a given period of time and subsequently returns the speed to the original rotational speed.

7. The optical disk drive according to claim 1, wherein defects in the specific area of defects are flaws or stains.

8. The optical disk drive according to claim 1, wherein the detection section detects the specific area of defects during the course of reproduction of data.

9. The optical disk drive according to claim 1, wherein the detection section previously detects the specific area of defects prior to reproduction of data and stores a detected address of the area of defects into memory; and the control section increases the rotational speed of the optical disk when the address of data to be reproduced coincides with the address of the area of defects stored in the memory.

10. An optical disk drive for reproducing data in an optical disk, comprising:
    a section for setting maximum speed conforming to at least type of an optical disk and any of amounts of side-to-side runout, mass eccentricity, and eccentricity in the optical disk;
    a section for reproducing data by setting rotational speed of the optical disk to the maximum speed;
    a section for determining whether or not disability to reproduce data is attributable to a specific area of defects when reproduction of data becomes impracticable; and
    a section for reproducing data again by increasing the rotational speed so as to become equal to or greater than the maximum speed when the disability to reproduce data is attributable to the specific area of defects and reproducing data again by decreasing the rotational speed when the disability to reproduce data is attributable to a factor other than the specific area of defects.

11. The optical disk drive according to claim 10, wherein defects in the specific area of defects are flaws or stains.

12. The optical disk drive according to claim 10, wherein defects in the specific area of defects are defects that decreases an amount of light returned from the optical disk.

* * * * *